United States Patent Office 2,730,004
Patented Jan. 10, 1956

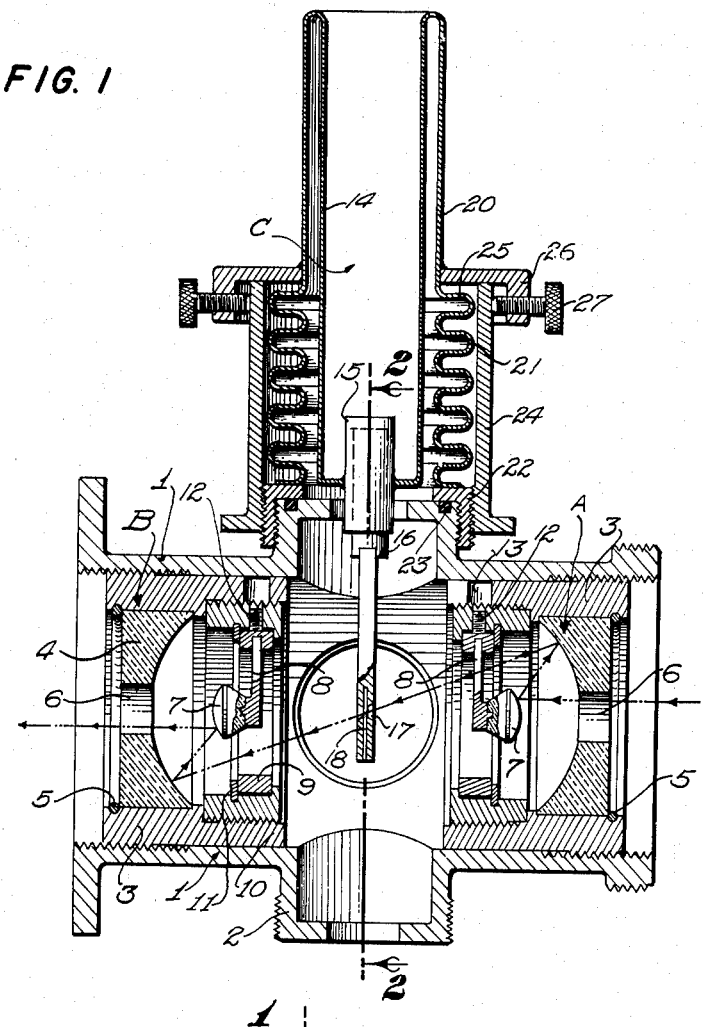

2,730,004
MICROILLUMINATOR FOR SPECTROMETERS

Richard M. Badger, Altadena, and Roger Newman, Pasadena, Calif., assignors to California Institute Research Foundation, Pasadena, Calif., a corporation of California Application September 17, 1951, Serial No. 247,004

6 Claims. (Cl. 88—14)

Our invention relates to microilluminators; that is to apparatus adapted to pass large amounts of radiation; for example, infra-red radiation through a small specimen and to collect it in such a manner that it can be passed through the primary slit of a monochromator or a spectrometer and can then be accepted by the collimating system of such apparatus.

Included in the objects of our invention are:

First, to provide a microilluminator which is particularly compact and self-contained so that it may be preadjusted and readily inserted in or removed from the optical path external to a monochromator or spectrometer with which it is used and which may be adapted to various makes of such apparatus.

Second, to provide a microilluminator which is capable of being hermetically sealed and maintained under vacuum or dry so as to facilitate infra-red or lower temperature spectrometry.

Third, to provide a microilluminator which employs similar condenser and objective systems utilizing only spherical mirrors and which provide for lateral adjustment to bring the condenser and objective systems into exact co-axial relationship as well as providing for accurate adjustment of the inter-mirror distances.

Fourth, to provide a microilluminator which incorporates a novel means for supporting and maintaining a specimen at the focal point of the optical system and wherein means are provided to facilitate extraction of heat from the specimen so positioned.

With the above and other objects in view as may appear hereinafter, reference is directed to the accompanying drawings in which Figure 1 is a longitudinal, sectional view of our microilluminator taken along the plane 1—1 of Figure 2.

Figure 2 is a transverse, sectional view through 2—2 of Figure 1 with the Dewar vessel omitted.

Our microilluminator includes a housing 1, cylindrical in form. One end of the housing is provided with a flange adapted to be closed by a plate, not shown, which incorporates an appropriate infra-red transmitting window. The other end of the housing is arranged for its ready connection to a conventional monochromator or spectrometer so as to place the optical system of the microilluminator in the exterior optical path established by such apparatus; that is, between the radiation source and the primary slit or entrance of the spectrometer or monochromator, or alternately in the path between the exit slit of such apparatus and a radiation detector. The central portion of the housing 1 is provided with four equally spaced, laterally directed nipples 2 which are externally threaded. One of these is connected to a vacuum system, not shown. Another is employed to support a Dewar vessel which carries the sample to be described hereinafter. Another of the nipples may be closed by a transparent window, not shown, for purposes of inspection, and still another may be arranged for the insertion of other instruments; for example, a thermometer.

The ends of the housing receive an optical condenser designated generally by A, and an objective system designated generally by B. The condenser and objective systems are identical in construction. More specifically, each extremity of the housing 1 is internally threaded to receive a tubular liner 3 having corresponding screw threads so that the liner may be adjusted axially. Each liner supports a concave mirror 4 having a concave spherical face directed toward the center of the housing. Each concave mirror is retained by a split ring 5 and is provided with a central aperture 6.

Mounted in front of each mirror 4 is a spherical mirror 7 of substantially smaller dimension. Each spherical mirror 7 is supported by a small rod 8 which is secured in a mounting ring 9. The mounting ring 9 is supported within a collar 10 between a shoulder forming a part of the collar and a retainer ring 11. The mounting rings fits loosely within the collar 10, and is adjustable radially therein by means of three equally spaced adjustment screws 12. This is desirable for the reason that the spherical mirror 7 must be exactly co-axial with the concave mirror 4.

The collar 10 is externally threaded to fit internal threads in the liner 3 and permit axial adjustment of the spherical mirror with respect to the concave mirror. In order that the spherical mirror may be adjusted radially while the collar is retained within the liner 3, the liner is provided with a series of radial apertures 13 permitting access to the set screws.

As mentioned hereinbefore, one of the nipples 2 receives a Dewar vessel C. The Dewar vessel includes an inner shell 14 closed at its inner end and receiving a socket member 15. The socket member 15 receives the cylindrical end of a sample holder 16. The extended end of the sample holder is flat and is provided at its extremity with an aperture 17 adapted to be located in the common axis of the concave mirrors 4 and spherical mirrors 7. The extremity of the sample holder is also split lengthwise so that a sample 18 may be inserted there-in and centered on the aperture 17.

The Dewar vessel includes an outer shell 20 sealed at its outer end to the inner shell. The radially inner portion of the outer shell 20 is corrugated as indicated by 21 and the extremity of the corrugated portion is attached to the internally flanged end of an internally threaded collar 22 adapted to be screw threaded on to one of the nipples 2. The flange of the collar 22 overlies the end of the nipple 2 and a seal member 23 is interposed.

The threaded collar 22 is also threaded externally to receive a cylindrical shell 24 which is adjustable radially with respect to the housing 1. The outer shell 20 of the Dewar flask is provided immediately above the corrugated portion 21 with a flange 25 having a skirt 26 which overlies the shell 24. The skirt is equipped with set screws 27 so that the Dewar vessel may be adjusted radially with respect to the shell 24 to effect axial and lateral movement of the sample 18 with respect to the housing 1.

The microilluminator is operated as follows:

The extremities of the housing are so arranged or modified as to permit insertion in the optical path between a radiation source and a conventional spectrometer or monochromator; for example, an infra-red radiation source and the entrance slit or aperture of the spectrometer or monochromator. Alternately the microilluminator may be installed between the exit slit or aperture of the spectrometer or monochromator and the radiation detector.

Before installation of the microilluminator the condenser and objective systems are adjusted by means of the set screws 12 to place the convex and concave mirrors in exact co-axial relation. Also by axial adjustment of the collar, the inter-mirror distance is likewise varied. The radii of the mirrors are predetermined by the nature of the incoming radiations and the desired character of the outgoing radiations; that is, the incoming radiations may be parallel, diverging, or converging, and it may be desirable to have converging, parallel or diverging outgoing radiations.

In any case, the condenser and objective systems are so adjusted in the housing that they are co-axial with each other and focus at a common point in the center of the housing. After the microilluminator is installed in place, the interior of the housing is placed under vacuum, and a coolant is placed in the Dewar vessel to bring the specimen to the desired temperature. The position of the specimen is adjusted axially by screws threading the shell 24 inwardly or outwardly on the collar 22. In addition lateral or axial adjustment of the specimen may be accomplished by the set screws 27. Once the specimen is at the point of focus of the condenser and objective optical systems, it will be seen that the rays or radiation passing through the aperture of the condenser system are reflected by its convex mirror on to its concave mirror and focussed on the specimen. The rays on passing through the specimen are collected by the concave mirror of the objective system, reflected on to its convex mirror and passing outwardly through the aperture to an auxiliary optical system which refocusses them on the slit of the spectrometer.

It should be pointed out that the means whereby the convex mirrors may be adjusted radially as well as axially enable the microilluminator to be pre-adjusted before being placed in use. By reason of the unitary rigid housing 1 adjustment, once made, is relatively permanent so that the microilluminator may be installed or removed with comparative ease and without necessitating frequent readjustment.

Having thus described certain embodiments and applications of our invention, we do not desire to be limited thereto, but intend to claim all novelty inherent in the appended claims.

We claim:

1. A microilluminator, comprising: a rigid housing having co-axial rigidly related mounting tubes, and a sealable laterally directed access aperture between said mounting tubes; an optical condenser system mounted in one of said coaxial tubes and an optical objective system mounted in the other of said coaxial tubes, said optical condenser system and optical objective system being similar similar and each including an apertured concave mirror and confronting convex mirror so disposed that said optical condenser system and optical objective system have a common focusing point coaxial with said mirrors; and means operable through and sealing said access aperture for disposing a specimen at said focusing point.

2. A microilluminator, comprising: a rigid housing; an optical condenser system and an optical objective system mounted in said housing, said optical condenser system and optical objective system being similar and each including an apertured relative concave mirror and confronting convex mirror and means for effecting lateral and intermirror adjustment of said mirrors whereby said optical condenser system and optical objective system have a common focusing point coaxial with said mirrors; a side opening in said housing; a Dewar container mounted thereover and arranged to support and abstract heat from a specimen suspended thereby at said focusing point between said optical condenser system and optical objective system.

3. A microilluminator, comprising: a rigid tubular housing adapted to be sealed to maintain a vacuum therein; and having rigid coaxially related mounting tubes, and a sealable laterally directed access aperture between said mounting tubes; an optical condenser system and an optical objective system fitted in said mounting tubes; said optical condenser system and optical objective system being similar and each including an apertured concave mirror and confronting convex mirror and means for effecting relative lateral and intermirror adjustment of said concave and convex mirrors, to dispose said mirrors in coaxial and focusing relation, said optical condenser system and optical objective system being bodily adjustable axially in their respective mounting tubes to establish a common focusing point coaxial with said mirrors; and means operable through and sealing said access aperture for disposing a specimen at said focusing point.

4. A microilluminator, comprising: a housing having coaxial rigidly related mounting tubes, and a sealable laterally directed access aperture between said mounting tubes; an optical condenser system and an optical objective system fitted in their respective mounted tubes in confronting relation with each other and sharing a common coaxial focusing point; each of said optical condenser system and optical objective systems including a line axially adjustable in its corresponding mounting tube a centrally apertured concave mirror carried by said liner a convex mirror also carried by said liner and means for effecting radial ajustment of said convex mirror to dispose said mirrors coaxially; and means operable through and sealing said access aperture for disposing a specimen at said focusing point.

5. A microilluminator, comprising; a housing, an optical condenser system and an optical objective system mounted in confronting relations within said housing and having a common coaxial focusing point; said optical condenser system and optical objective system each including a liner axially adjustable in said housing, a centrally apertured concave mirror carried by said liner, a convex mirror also carried by said liner and means for effecting radial adjustment of said convex mirror to dispose said mirrors coaxially; a side opening in said housing; a Dewar flask means mounted thereover and arranged to support and abstract heat from a specimen suspended thereby between said optical condenser system and optical objective systems.

6. A microilluminator comprising: a housing adapted to be sealed to maintain a vacuum therein; and including a pair of relatively fixed coaxial mounting tubes and a sealable lateral aperture therebetween; an optical condenser system and an optical objective system fitted in confronting relation in said mounting tubes and having a common coaxial focusing point; said codenser system and optical objective system each including a liner axially adjustable in its corresponding mounting tube, a centrally apertured concave mirror carried by said liner, a convex mirror also carried by said liner and means for effecting radial adjustment of said convex mirror to dispose said mirror coaxially; means operable through and sealing said access aperture for suspending a specimen at said focusing point; means for extracting heat from said suspending means.

References Cited in the file of this patent

UNITED STATES PATENTS

| | | |
|---|---|---|
| 1,016,369 | Siedentopf | Feb. 6, 1912 |
| 1,179,441 | Lewis | Apr. 18, 1916 |
| 1,653,694 | Branson | Dec. 27, 1927 |
| 1,776,712 | Voellmy | Sept. 13, 1930 |
| 1,978,096 | White | Oct. 23, 1934 |
| 2,254,062 | Devol | Aug. 26, 1941 |

FOREIGN PATENTS

| | | |
|---|---|---|
| 350,968 | Great Britain | Dec. 9, 1929 |